(12) United States Patent
Hays

(10) Patent No.: US 10,678,040 B1
(45) Date of Patent: Jun. 9, 2020

(54) MICROSCOPE SLIDE MOUNTING SYSTEM

(71) Applicant: Thomas Edward Hays, Galveston, TX (US)

(72) Inventor: Thomas Edward Hays, Galveston, TX (US)

( * ) Notice: Subject to any disclaimer, the term of this patent is extended or adjusted under 35 U.S.C. 154(b) by 348 days.

(21) Appl. No.: 15/852,295

(22) Filed: Dec. 22, 2017

Related U.S. Application Data

(60) Provisional application No. 62/438,779, filed on Dec. 23, 2016.

(51) Int. Cl.
*G02B 21/34* (2006.01)
*G01N 1/30* (2006.01)

(52) U.S. Cl.
CPC ............... *G02B 21/34* (2013.01); *G01N 1/30* (2013.01)

(58) Field of Classification Search
CPC .................................. G02B 21/34; G01N 1/30
See application file for complete search history.

(56) References Cited

U.S. PATENT DOCUMENTS

2015/0147779 A1*  5/2015  Simon ...................... G01N 1/30
                                                                435/40.5

* cited by examiner

*Primary Examiner* — Wen Huang
(74) *Attorney, Agent, or Firm* — Eldredge Law Firm

(57) ABSTRACT

A microscope slide mounting system includes a slide mounting medium, with a predetermined weight of powdered gum arabic in a predetermined weight of distilled water; a predetermined weight of anhydrous chloral; a predetermined weight of anhydrous glycerin; and a predetermined percentage of ethylene glycol; the ethylene glycol acts as a denaturant in the mounting medium; and the ethylene glycol causes mild illness when ingested, thereby discouraging the use of the mounting medium as a sedative or recreational drug and prevents the crystallization of the medium.

8 Claims, 3 Drawing Sheets

MICROSCOPE SLIDE MOUNTING SYSTEM

BACKGROUND

1. Field of the Invention

The present invention relates generally to life-science systems, and more specifically, to a microscope slide mounting system for discouraging ingestion of microscope mounting medium and preventing crystallization of the mounting medium over time.

2. Description of Related Art

Microscope slide mounting systems are well known in the art and are effective means to examine and preserve biologic specimens. For example, FIG. 1 depicts a conventional microscope mounting system 101 having a microscope 103 with a stage 105 and an eyepiece 107, the stage 105 in communication with a slide 109. The slide 109 holds a specimen 111 covered in a mounting medium 113, and a cover slip 115. During use, the slide 109 with the specimen 111 is secured to the stage 105, and the specimen 111 is examined through the eyepiece 107.

One of the problems commonly associated with system 101 is toxicity. For example, a conventional mounting medium 113 comprises a mixture of gum arabic, glycerin, and chloral hydrate or anhydrous chloral, which have a toxic effect if ingested.

Accordingly, although great strides have been made in the area of microscope slide mounting systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
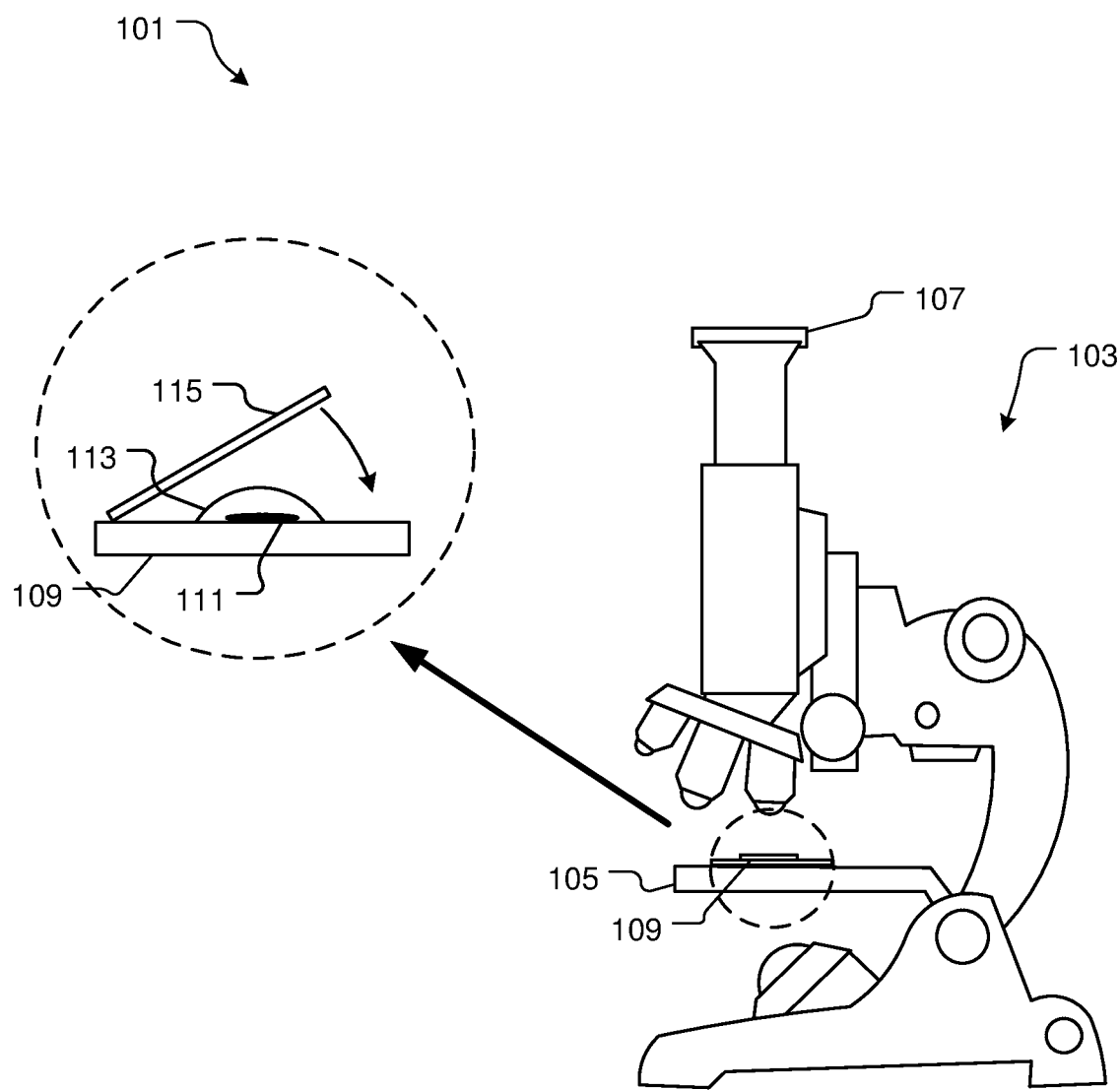
FIG. 1 is a side view of a common microscope slide mounting system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional microscope slide mounting systems. Specifically, the present invention improves safety by discouraging ingestion of the mounting medium. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
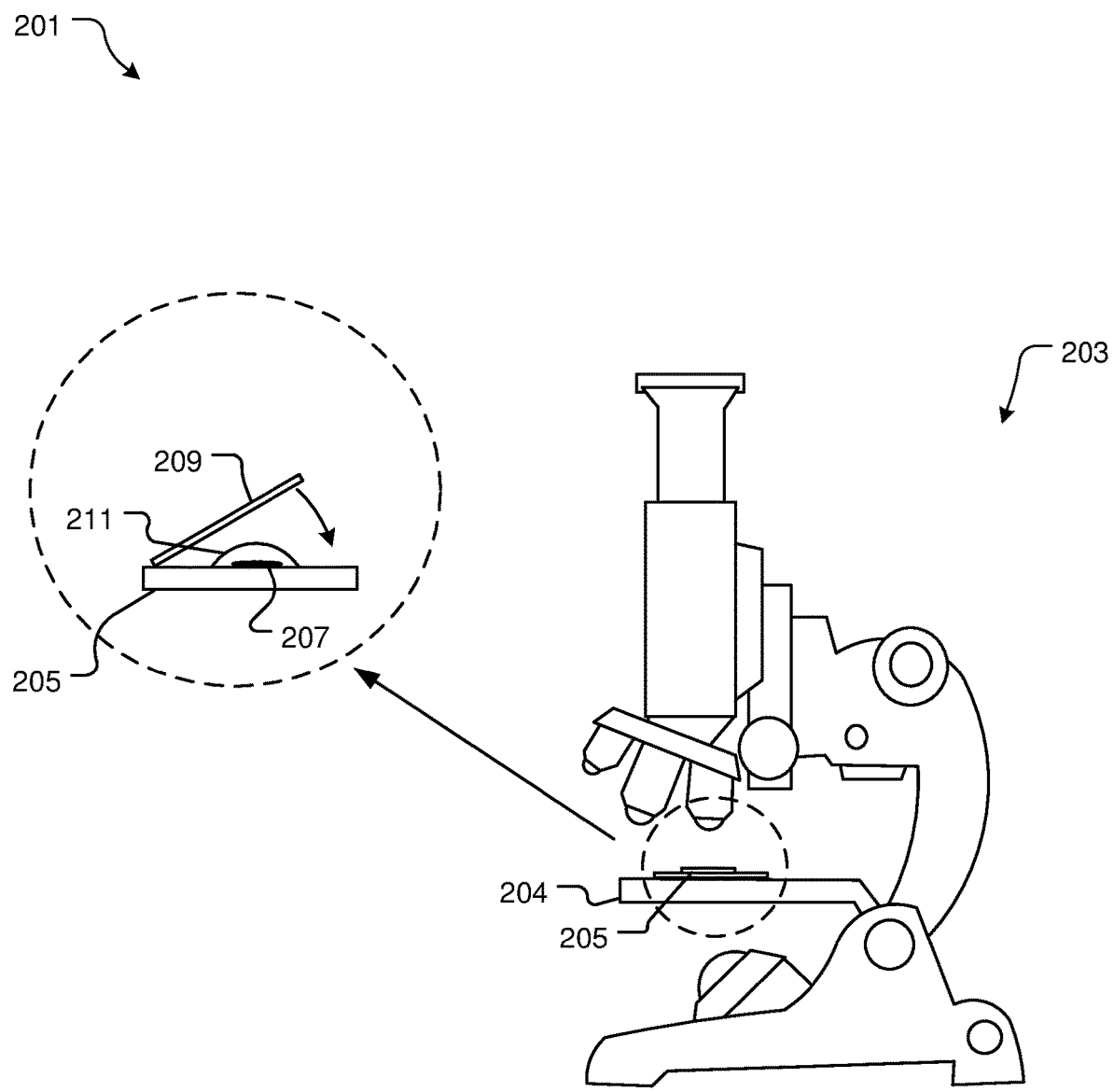
FIG. 2 is a side view of a microscope slide mounting system in accordance with a preferred embodiment of the present application.

Referring now to the drawings wherein like reference characters identify corresponding or similar elements throughout the several views, FIG. 2 depicts a side view of a microscope slide mounting system in accordance with a preferred embodiment of the present application. It will be appreciated that system 201 overcomes one or more of the above-listed problems commonly associated with conventional microscope slide mounting systems.

In the contemplated embodiment, system 201 includes a microscope 203 with a stage 204 securing a slide 205 with a specimen 207 and a cover slip 209, and a mounting medium 211 covering the specimen 207, wherein the composition of the mounting medium 211 causes mild illness when ingested and thereby discourages ingestion and improves safety. In addition, the composition prevents crystallization of mounting medium 211.

Figure 3:
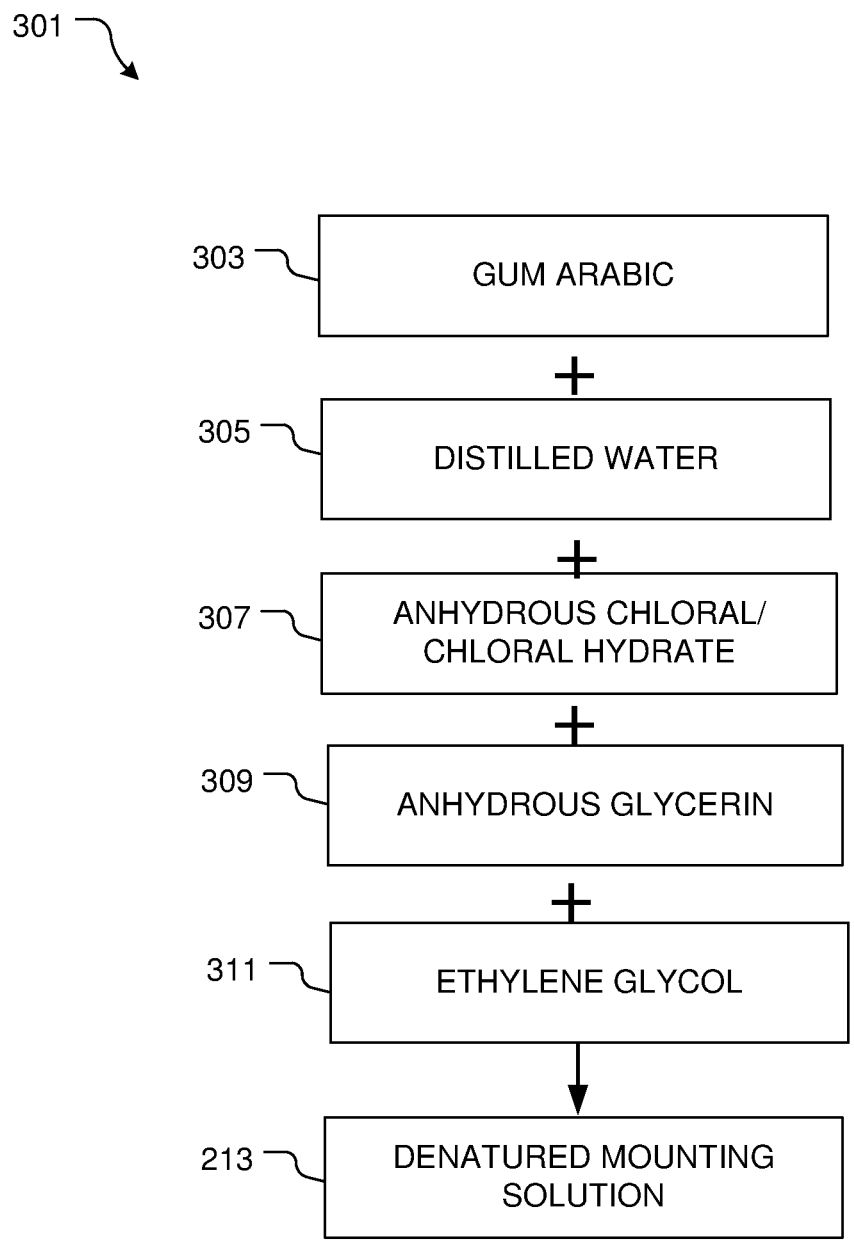
FIG. 3 is a simplified diagram of the formula for the mounting medium from FIG. 2.

In FIG. 3 a simplified formula 301 for the mounting medium 213 is shown. In the preferred embodiment, the mounting medium 211 comprises gum arabic 303 in distilled water 305, anhydrous chloral or chloral hydrate 307, anhydrous glycerin 309, and ethylene glycol 311, wherein the ethylene glycol 311 acts as a denaturing agent, causing the mounting medium 211 to act as a mild poison if ingested and the ethylene glycol 311 prevents crystallization of the mounting medium 213.

It should be appreciated that one of the unique features believed characteristic of the present application is the use of ethylene glycol 311 as a denaturing agent. It should be appreciated that the addition of ethylene glycol 311 to a mounting medium improves safety by causing nausea when ingested.

Another unique feature believed characteristic of the present application is the use of ethylene glycol 311 to prevent crystallization of the mounting medium. It should be appreciated that this feature is an improvement over prior art, as it allows for specimens to remain viewable for long periods of time.

It is contemplated that the ethylene glycol 311 can be added to various formulas of mounting mediums. In one contemplated formula, the mounting medium comprises approximately 13-14 parts by weight of powdered gum arabic in approximately 19 parts by weight of distilled water, approximately 58-62 parts by weight of anhydrous chloral, approximately 6-9 parts by weight of anhydrous glycerin, and approximately 3% ethylene glycol. In a second contemplated formula, the mounting medium comprises approximately 15 parts by weight of powdered gum arabic in approximately 25 parts by weight of distilled water, approximately 75 parts by weight of chloral hydrate, approximately 5 parts by weight of anhydrous glycerin, and approximately 3% ethylene glycol.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A microscope slide mounting system, comprising:
 a slide mounting medium, having:
  a predetermined weight of powdered gum arabic in a predetermined weight of distilled water;
  a predetermined weight of anhydrous chloral;
  a predetermined weight of anhydrous glycerin; and
  a predetermined percentage of ethylene glycol;
 wherein the ethylene glycol acts as a denaturant in the mounting medium; and
 wherein the ethylene glycol causes mild illness when ingested, thereby discouraging the use of the mounting medium as a sedative or recreational drug.

2. The system of claim 1, wherein the predetermined percentage of ethylene glycol is 3%.

3. The system of claim 1, wherein the predetermined weight of powdered gum arabic is 13-14 parts by weight, the predetermined weight of distilled water is 19 parts by weight; the predetermined weight of anyhydrous chloral is 58-62 parts by weight; and the predetermined weight of anhydrous glycerin is 6-9 parts by weight.

4. The system of claim 1, wherein the predetermined weight of powdered gum arabic is 15 parts by weight, the predetermined weight of distilled water is 75 parts by weight; the predetermined weight of anyhydrous chloral is 75 parts by weight; and the predetermined weight of anhydrous glycerin is 5 parts by weight.

5. A microscope slide mounting system, comprising:
 a slide mounting medium, having:
  a predetermined weight of powdered gum arabic in a predetermined weight of distilled water;
  a predetermined weight of anhydrous chloral;
  a predetermined weight of anhydrous glycerin; and
  a predetermined percentage of ethylene glycol;
 wherein the ethylene glycol prevents chrystalization of the mounting medium.

6. The system of claim 5, wherein the predetermined percentage of ethylene glycol is 3%.

7. The system of claim 5, wherein the predetermined weight of powdered gum arabic is 13-14 parts by weight, the predetermined weight of distilled water is 19 parts by weight; the predetermined weight of anyhydrous chloral is 58-62 parts by weight; and the predetermined weight of anhydrous glycerin is 6-9 parts by weight.

8. The system of claim 5, wherein the predetermined weight of powdered gum arabic is 15 parts by weight, the predetermined weight of distilled water is 75 parts by weight; the predetermined weight of anyhydrous chloral is 75 parts by weight; and the predetermined weight of anhydrous glycerin is 5 parts by weight.

* * * * *